United States Patent [19]

Sauer et al.

[11] 4,299,64(

[45] Nov. 10, 198:

[54] MANUFACTURE OF AIR OXYGEN ELECTRODES

[75] Inventors: Hans Sauer, Idstein-Walsdorf; Wolfgang Kloss, Ellwangen, both of Fed. Rep. of Germany

[73] Assignee: Varta Batterie Aktiengesellschaft, Hanover, Fed. Rep. of Germany

[21] Appl. No.: 17,470

[22] Filed: Mar. 5, 1979

[30] Foreign Application Priority Data

Mar. 20, 1978 [DE] Fed. Rep. of Germany ....... 2812040

[51] Int. Cl.³ .......................... B32B 31/00; C08J 5/02
[52] U.S. Cl. ............................... 156/278; 156/307.1; 156/307.3; 156/307.7; 428/173; 428/421

[58] Field of Search ..................... 156/278, 307, 307.1 156/307.3, 307.7; 428/421, 538, 158, 173, 15

[56] References Cited

U.S. PATENT DOCUMENTS

| 3,156,608 | 11/1964 | Kamins et al. | 156/307 ) |
| 3,376,183 | 4/1968 | Flynn et al. | 156/278 ) |
| 3,540,966 | 11/1970 | Baker et al. | 156/30 |
| 3,799,827 | 3/1974 | Takimoto et al. | 156/307 ) |

*Primary Examiner*—Thomas J. Herbert, Jr.
*Attorney, Agent, or Firm*—Weiser, Stapler & Spivak

[57] ABSTRACT

An electrode tape is made by uniting a polytetrafluor ethylene foil and a catalyst layer between compressioi rollers, after having moistened the foil with a wetting easily volatilizable liquid.

12 Claims, 1 Drawing Figure

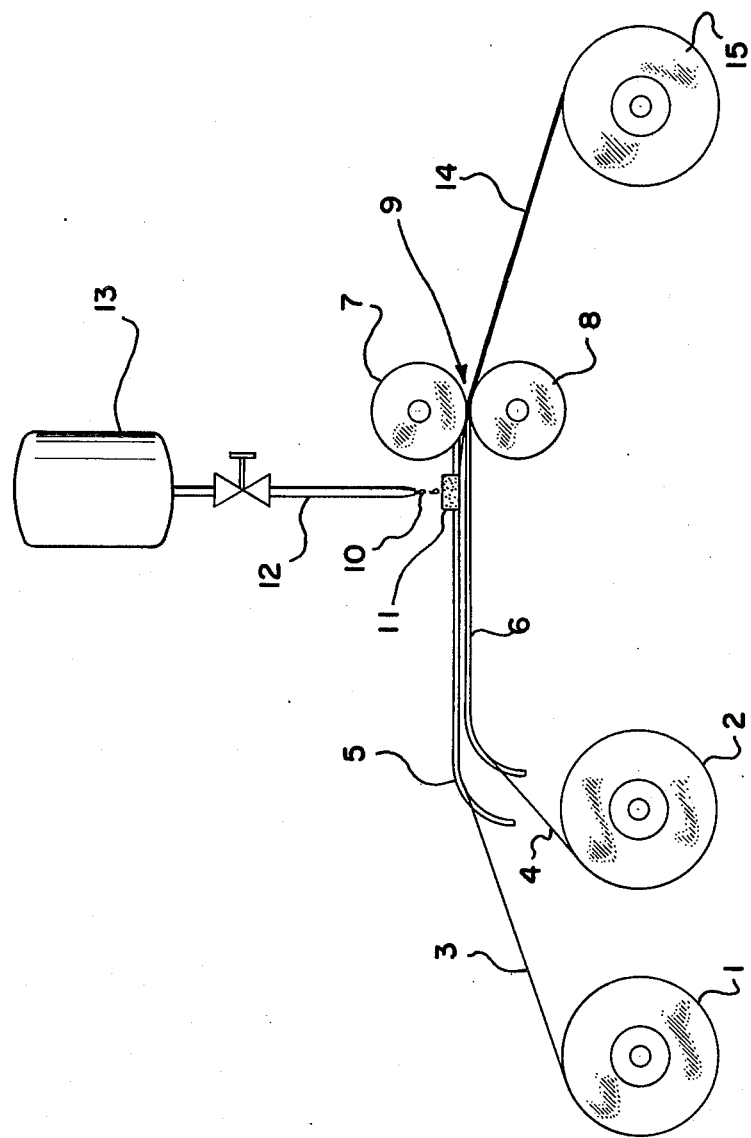

MANUFACTURE OF AIR OXYGEN ELECTRODES

The invention relates to a method of manufacturing an air oxygen electrode which consists of a porous polytetrafluorethylene foil and a catalyst layer attached thereto and essentially containing activated carbon.

The positive electrodes provided for galvanic air oxygen elements are customarily composed of two layers, one of which contains the catalyst material and constitutes the actual air electrode while the other, mostly a gas transmissive hydrophobic synthetic plastic foil, serves as the carrier for the catalyst layer and simultaneously separates the interior of the cell from the ambient atmosphere.

In a known air oxygen electrode of this type the carrier is a porous polytetrafluorethylene foil. The catalyst layer consists of a mixture of activated carbon and polytetrafluorethylene powder which is rolled onto a current take-off fabric of silvered nickel wire.

In accordance with prior conventional practice, the polytetrafluorethylene foil was pressed onto the catalyst layer by means of a quilting ram. For this purpose, the quilting ram was so shaped that regions of high compressive force, good adhesion and low permeability alternated with regions of low compressive force without adhesion and high permeability.

Thus, for firm joining of the two layers a nonhomogenous electrode material had to be taken into account. In addition this method was subject to the undesireable property of the rolled polytetrafluorethylene, which is that it exhibits in regions of high density a tendency to rupture in the direction of rolling even under very low deformation. This always led to lack of tightness of the cells.

In the regions of low adhesion or no adhesion at all, an electrolyte film can form between the polytetrafluorethylene foil and the catalyst layer which interrupts the air supply. Whenever the electrode then also drops below a predetermined operating potential, there can occur gas evolution and a lack of tight sealing due to build up of pressure.

Accordingly, it is an object of the present invention to join the rolled polytetrafluorethylene foil to the catalyst layer without destruction of its pore system in tight adhesion and to eliminate the above-mentioned threats to reliable electrode operation.

This and other objects that will appear are achieved in accordance with the invention by applying the polytetrafluorethylene foil to the catalyst layer between rollers in such manner that the pores of the polytetrafluorethylene foil are filled at least during the period of roller application with a wetting, easily volatilizable liquid.

In this roller process, the polytetrafluorethylene foil and the catalyst layer are removed in tape configurations continuously from respective storage reels and are united uniformly and tightly into an electrode tape.

Suprisingly it has been found that the pore system of the foil does not suffer any damage under the roller pressure when it is filled, before the foil enters the nip of the rollers, with a wetting, easily volatilizable liquid. For this purpose there are fundamentally suitable all liquids having low boiling point and low reactivity, preferably paraffin carbonates in the range $C_3$ to $C_8$. In particular, light benzene or petroleum ether are suitable, which volatilize without leaving a residue a few seconds after the finished electrode tape leaves the roller mechanism. As a minimum, there should remain with the electrodes no adsorbates which would cause marked reduction in catalytic activity of the activ carbon in the catalyst mass.

To prevent partial pressing of the liquid out of tl pores, during the roller treatment, it has proven adva: tageous to roughen the roller which faces the polytetr fluorethylene foil by sand blasting or the like. By the: means the micropores in the foil surface are kept existence to a great degree and it acquires a nappe appearance.

By means of the roller pressure the permeability ( the polytetrafluorethylene foil, which is preferably u: sintered can be varied within wide limits. This is impo tant in view of the exchange processes with the atm( sphere and the type of load for which the cell is i: tended.

By means of the roller process embodying the invei tion, the embedding of the wire mesh serving as currei take off in the catalyst layer is also appreciably in proved, as compared with its condition in the tape-lil starting material. This surprising effect is evidently als attributable to the pore filling liquid because it additio1 ally serves as a lubricant.

For further details, reference is made to the accomp; nying drawing wherein the single FIGURE diagramat cally illustrates a roller system embodying the inver tion.

In this FIGURE, the storage reel 1 has a polytetrafh orethylene foil 3 unwinding from it and the storage re( 2 has a catalyst tape 4 unwinding from it. These tap( are accurately positioned relative to each other b means of the closely adjacent guidance plates 5, 6 an are then supplied to rollers 7, 8. Guidance plates 5, have upturned rims which impart to them a flat l shaped profile. Roller 7 is slightly roughened. Bot rollers are made of steel. Another suitable material fc the rollers—preferably for the roller adjacent to th polytetrafluorethylene foil—is rubber or an elastic pla: tic. Before the polytetrafluorethylene foil 3 enters rolle nip 9 there is lightly pressed onto it a sponge 11, soake with a pore filling liquid 10. An adjustable supply 1 refills liquid 10 from a storage container 13. Cataly: tape 4, on the other hand, remains unaffected by th liquid treatment because it is covered by guidance plat 5 until just before entering between the rollers. Th finished electrode tape 14 is taken up by storage reel 1!

In contrast with the method of ram pressing, th roller process embodying the invention provides se\ eral significant advantages. The overall thickness of th air oxygen electrodes is diminished by about 0.1 mill meters, the susceptibility of the polytetrafluorethylen foil to crack formation is substantially reduced, and th adhesion of the catalyst mass to the polytetrafluorethy ene foil is significantly improved. The roller apparatt functions without much power and delivers the finishe product via a single storage reel to the location at whic electrode insertion takes place.

I claim:

1. A method of manufacturing an air oxygen elec trode which comprises a porous polytetrafluorethylen foil and a catalyst layer which is attached to the foil an which contains essentially activated carbon, sai method comprising uniting the polytetrafluorethylen foil with the catalyst layer between rollers, the pores c the polytetrafluorethylene foil containing, at least whil between the rollers, a wetting, easily volatilizable lic lid, and volatilizing the liquid from the pores of the foil after passage between the rollers.

2. The method of claim 1 wherein only the polytetrafluorethylene foil is wetted with the liquid prior to introduction between the rollers.

3. The method of claim 1 wherein the foil and the catalyst layer united by compression between the rollers is wound up on a storage reel.

4. The method of claim 1 wherein the polytetrafluorethylene foil and the catalyst layers are unwound from respective storage reels for introduction between the rollers.

5. The electrode produced by the method of claim 1.

6. The method of claim 1 wherein the roller which is adjacent the polytetrafluorethylene foil is made of rubber.

7. The method of claim 1 wherein the roller which is adjacent the polytetrafluorethylene foil comprises an elastic material.

8. The method of claim 1 wherein the roller which is adjacent the polytetrafluorethylene foil has a roughened surface.

9. The method of claim 8 wherein the roughened roller surface is such as to impart to the adjacent foil surface a napped appearance.

10. The method of claim 1 wherein the liquid is a paraffin carbonate with low boiling point.

11. The method of claim 10 wherein the paraffin carbonate is in the range $C_3$ to $C_8$.

12. The method of claim 10 wherein the liquid is benzene or petroleum ether.

* * * * *